United States Patent
Davis (10) Patent No.: US 7,958,354 B1
(45) Date of Patent: Jun. 7, 2011

(54) HIGH-ORDER KNOWLEDGE SHARING SYSTEM TO DISTRIBUTE SECRET DATA

(75) Inventor: Justin D. Davis, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 701 days.

(21) Appl. No.: 12/070,134

(22) Filed: Feb. 14, 2008

(51) Int. Cl.
  *H04L 9/00* (2006.01)
(52) U.S. Cl. ........ 713/170; 713/171; 713/176; 713/181; 380/44
(58) Field of Classification Search ................. 713/150, 713/170–171, 155–157, 168, 173, 180–181, 713/189, 163, 176, 177; 380/28, 30, 46, 380/277–278; 726/2, 3, 10
See application file for complete search history.

(56) References Cited

U.S. PATENT DOCUMENTS

| | | | |
|---|---|---|---|
| 4,405,829 A | 9/1983 | Rivest | |
| 5,144,667 A | 9/1992 | Pogue | |
| 5,724,428 A | 3/1998 | Rivest | |
| 5,835,600 A | 11/1998 | Rivest | |
| 5,903,649 A | 5/1999 | Schwenk | |
| 5,991,415 A | 11/1999 | Shamir | |
| 6,026,163 A | 2/2000 | Micali | |
| 6,035,402 A * | 3/2000 | Vaeth et al. | 726/2 |
| 6,269,163 B1 | 7/2001 | Rivest | |
| 6,477,648 B1 * | 11/2002 | Schell et al. | 726/22 |
| 6,985,583 B1 | 1/2006 | Brainard | |
| 7,065,210 B1 | 6/2006 | Tsujii | |
| 7,212,632 B2 | 5/2007 | Scheidt | |
| 7,240,202 B1 | 7/2007 | Orman | |
| 7,269,261 B1 | 9/2007 | Jennings | |
| 7,269,736 B2 | 9/2007 | Howard | |
| 2007/0192397 A1 | 8/2007 | Lauter | |

FOREIGN PATENT DOCUMENTS

WO WO 02/45340 6/2002

* cited by examiner

*Primary Examiner* — Hosuk Song
(74) *Attorney, Agent, or Firm* — Matthew J. Evans; Daniel M. Barbieri (57) ABSTRACT

Using a high order shared knowledge mechanism where multiple parties are given multiple shares of a shared 'common' secret data, dependent upon role and scenario. It is possible to distribute pre-generated, accountable, as well as escrowed key material to remote units. When the order of the shares and quantities are controlled properly, it is possible to compromise an entity distributing the knowledge shares allowing reconstruction of 'common' secret data without loss of the actual data, and compromise of any party receiving the knowledge shares only compromises the common secret data which have already been distributed to that party. Multiple common secret data may be distributed to remote units which are only required to store a single set of knowledge shares to enable reception of multiple common secret data.

35 Claims, 4 Drawing Sheets

FIG. 4

HIGH-ORDER KNOWLEDGE SHARING SYSTEM TO DISTRIBUTE SECRET DATA

BACKGROUND OF THE INVENTION

1. Field of the Invention

The present invention relates generally to techniques for secure communications and cryptographic systems and more specifically to methods and systems for secure distribution of pre-generated key material using a high order and/or convolved knowledge sharing.

2. Description of the Related Art

Within many secure systems the need to perform escrow of encryption keys is a growing need. Within military battle engagements data is often recorded and encrypted for later analysis. In banking, transactions must often be recorded for posterity but be maintained in a confidential manner. In the case of VPN networks which contain routers, it is often required to decrypt and re-encrypt traffic at multiple locations (adding latency and potential security vulnerabilities) due to the use of different cryptographic keys.

In many of these scenarios it becomes necessary for all parties involved to utilize the same key for cryptographic encryption and decryption. The difficulty is distributing the key to multiple parties in a secure manner (particularly where escrow may be required) which does not require physically connecting to the system to input the key. Such a practice is often used with very high assurance systems, but this activity is cost prohibitive in most applications.

Eliminating the need to physically connect to each system, a simple Diffie-Hellman approach (or other key establishment system within the art of cryptography) may be used to create a 'session' key which is used to encrypt the actual key during transit. This approach as well as the physical connection approach is vulnerable in that a compromise of the element distributing key material may compromise the entire system. Key splits have been used to ensure that the key distributing element may be compromised while not compromising the system. These approaches require a generation element with access to the original key, or require a separate piece of data to be stored for each key.

U.S. Pat. No. 7,212,632, issued to Edward M. Scheidt, et al., entitled, "Cryptographic Key Split Combiner" discloses a process and apparatus for assembling keys which provides added security against compromising a communication by unauthorized entities, and a process and apparatus for assembling keys which provides added security against compromising a communication by unauthorized entities.

U.S. Pat. No. 7,065,210, issued to Shigeo Tsujii, et al., entitled, "Secret Key Generation Method, Encryption Method, Cryptographic Communications Method, Common Key Generator, Cryptographic Communications System, and Recording Media" discloses a secret key generation method, encryption method, and cryptographic communications method based on an ID-NIKS, wherewith specifying information (ID information) is divided into a plurality of portions, and all secret keys based on the divided specifying information are distributed to entities from each of a plurality of centers, whereby it is possible to minimize the mathematical structures, circumvent the collusion problem, and facilitate the construction of the cryptosystem.

U.S. Pat. No. 7,269,261, issued to William T. Jennings, entitled, "Key Escrow Systems" discloses key escrow systems that comprise a class of cryptographic systems specifically intended for the storage of cryptographic keying information. These systems have requirements unique from other common cryptographic applications and implementation of key escrow systems requires special considerations beyond those of other secure systems. The Jennings invention relates to techniques, which can be applied to systems such as those used for Key escrow. However, the techniques have a wider range of application. The described methodology for modular multiplication has a range of applicability in fields including Cryptography, Fault-Tolerant Computation, and Digital Signal Processing (DSP).

SUMMARY OF THE INVENTION

The present invention addresses a mechanism to distribute keys securely while maintaining an ability to perform escrow as well as accounting of key material and requiring a very minimal set of data to be stored on remote system elements. In a broad aspect, the present invention is a method for communicating common secret data within a system having a set of entities, the set of entities comprising at least one trusted entity and a plurality of partner communicator entities, the plurality of potential partner communicator entities being provided with a public certificate and a private key, wherein a subset of the plurality of partner communicator entities attempt to join together to compromise the system. The method of communicating includes the steps of: a) providing a system having a non-trusted communications channel, and a trusted communications channel; b) determining a maximum number of potential partner communicator entities in the system, the maximum number of the potential partner communicator entities being denoted as $\eta$; c) generating a common secret data component, denoted as $\omega$; d) building an equation based upon the maximum number of the potential partner communicator entities in the system, wherein the common secret data component, $\omega$, is part of the equation, and the equation is based upon $\eta+1$ variables; e) generating a special 'public' ordered data set, denoted as $\rho$, for one trusted entity from the equation for later distribution to the plurality of potential partner communicator entities; f) communicating the special 'public' ordered data set $\rho$ over the trusted communications channel to the trusted entity; g) generating a unique ordered data set, denoted as $\lambda_i$, for each of the potential partner communicator entities in the system from the equation, where i=0, 1, ... $\eta-1$; h) communicating the $\lambda_i$ unique ordered data sets to the corresponding potential partner communicator entity using the trusted communications channel; i) communicating the special ordered data set $\rho$ using the non-trusted communications channel from the trusted entity to each of the potential partner communicator entities requiring the common secret data component $\omega$; and, j) using a combination of the special ordered data set $\rho$ and the unique ordered data set $\lambda_i$ to calculate the common secret data $\omega$ from the information communicated by $\lambda_i$ and $\rho$.

This invention makes use of a high order knowledge sharing scheme which ensures that an entire set of knowledge shares present on remote system elements may not be combined to reconstruct the secret knowledge. When the elements stored on a distribution device are combined with one or more knowledge shares on the remote system elements, the device is capable of reconstructing the secret knowledge. The remote system elements may combine the entire set of knowledge shares and even through this collusion the remote system elements would not be capable of reconstitution of the secret knowledge, since enough knowledge shares generated by the knowledge sharing equation are absent from the remote system element. The remote system elements are dependent upon the distribution element to allow for the reconstitution of the secret knowledge. The use of the 'high order' knowledge scheme allows for field replacement of the secret knowledge (e.g. cryptographic key, public certificate, etc) without replacement of the knowledge shares which are pre-placed onto the remote system elements while maintaining the level of control and accountability required by high assurance systems, and often logistically unavailable (due to cost) to non-military systems.

DETAILED DESCRIPTION OF THE INVENTION

Figure 1:
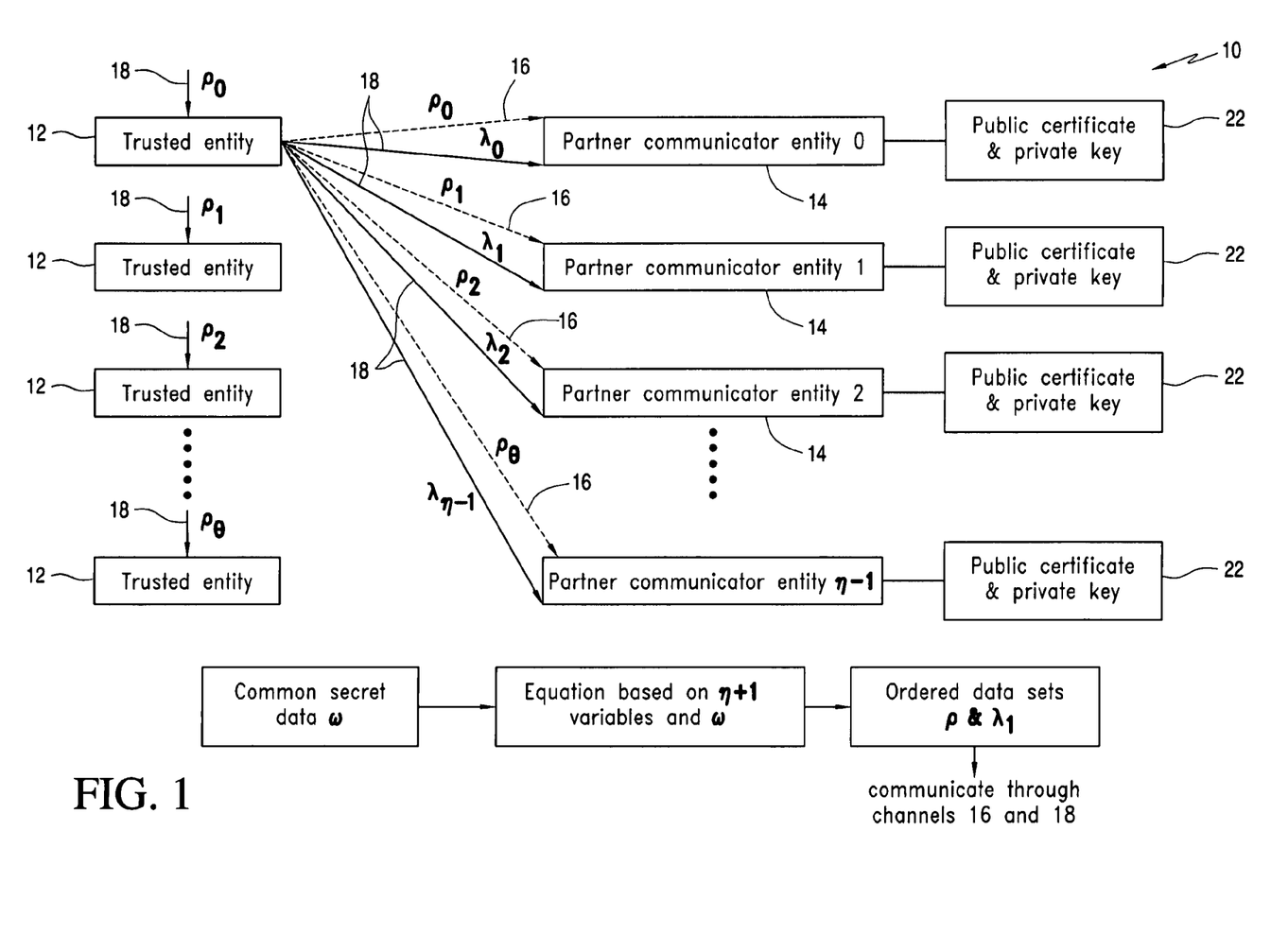
FIG. 1 is a block diagram of a cryptographic system for secure distribution of pre-generated key material in accordance with the principles of the present invention.

Referring now to FIG. 1, a cryptographic system of the present invention for secure distribution of pre-generated 'common' secret data (typically symmetric cryptographic keys common to a group of communicators) is illustrated, designated generally as 10. The system has at least one trusted entity 12 and multiple potential partner communicator entities 14. The trusted entities 'distribute' secret data components through the process of storing and distributing ordered data sets (also known as knowledge shares). These ordered data sets are benign in nature; that is, these ordered data sets reveal no information as to the value(s) of the common secret data until a sufficient quantity and format of data sets have been combined. Access to the common secret data by the trusted field entity is not required.

The system 10 has a non-trusted communications channel 16 and a trusted communications channel 18. In the event that a subset (or the full set) of the potential partner communicator entities 14 attempt collusion to compromise the system 10, the system remains secure due to the absence of the ordered data set from the trusted entity.

In asymmetric cryptography, two different but mathematically related keys are used—a public key and a private key. A public key system is so constructed that calculation of one key (the 'private key') is computationally infeasible from the other (the 'public key'), even though they are necessary related. Instead, both keys are generated secretly, as an interrelated pair. In public key cryptosystems, the public key may be freely distributed, while its pair private key must remain secret. The public key is typically used for encryption, while the private key or secret key is usually used for decryption.

In addition to encryption, public-key cryptography can be used to implement digital signature schemes. A digital signature is reminiscent of an ordinary signature; they both have the characteristic that they are easy for a user to produce, but difficult for anyone else to forge. Digital signatures can also be permanently tied to the content of the message being signed; they can't be 'moved' from one document to another, for any attempt will be detectable. In digital signature schemes, there are two steps: the first, signing, in which a private key is used to process the message or a hash of the message, or both, and the second, verification, in which the matching public key is used with the message to check the validity of the signature.

A standard private key and public certificate 22 are associated with each of the potential partner communicator entities, as well as each of the trusted entities. The private key and public certificate are used by each of the potential partner communicator entities to verify the 'public' ordered data set corresponding to the trusted entities, and as necessary provide confirmation of proper reception/calculation of the common secret data to the trusted entities.

The maximum number of potential partner communicator entities is denoted as $\eta$ and must be defined to a fixed value before establishing an equation which will be employed to generate knowledge shares, and consequently prior to generation of any ordered data set. A unique ordered data set 20 associated with each of the potential partner communicator entities is provided through a trusted communication channel. This ordered data set must be protected by the communicator entity as though it were a private key used in a standard asymmetric cryptographic system. The data set must be provided to the partner communicator entities over a 'trusted' communications channel since the data is used to form the basis element of the secret data being received from the trusted entity.

The trusted communication channel may be an external data storage media such as a floppy diskette, a flash memory device, a CD/DVD ROM or a portable hard disk drive or other physical storage medium. If a physical provisioning process is not necessary or deemed undesirable, the ordered data set may be communicated using a non-trusted communication channel by effectively building a trusted communication channel using asymmetric keys as described above. It should be noted that the 'private' ordered data set held by the communicator entity is only as secure as the trusted communication channel used to communicate the data. If asymmetric keys are used, they would still need to be provisioned using a physical communication channel as described above to maintain the same level of security assurance. Functionally, the methods of this innovation could be performed without a trusted communication channel; however, this would be extremely insecure, and would fail to meet any best practices of the art.

Figure 2:
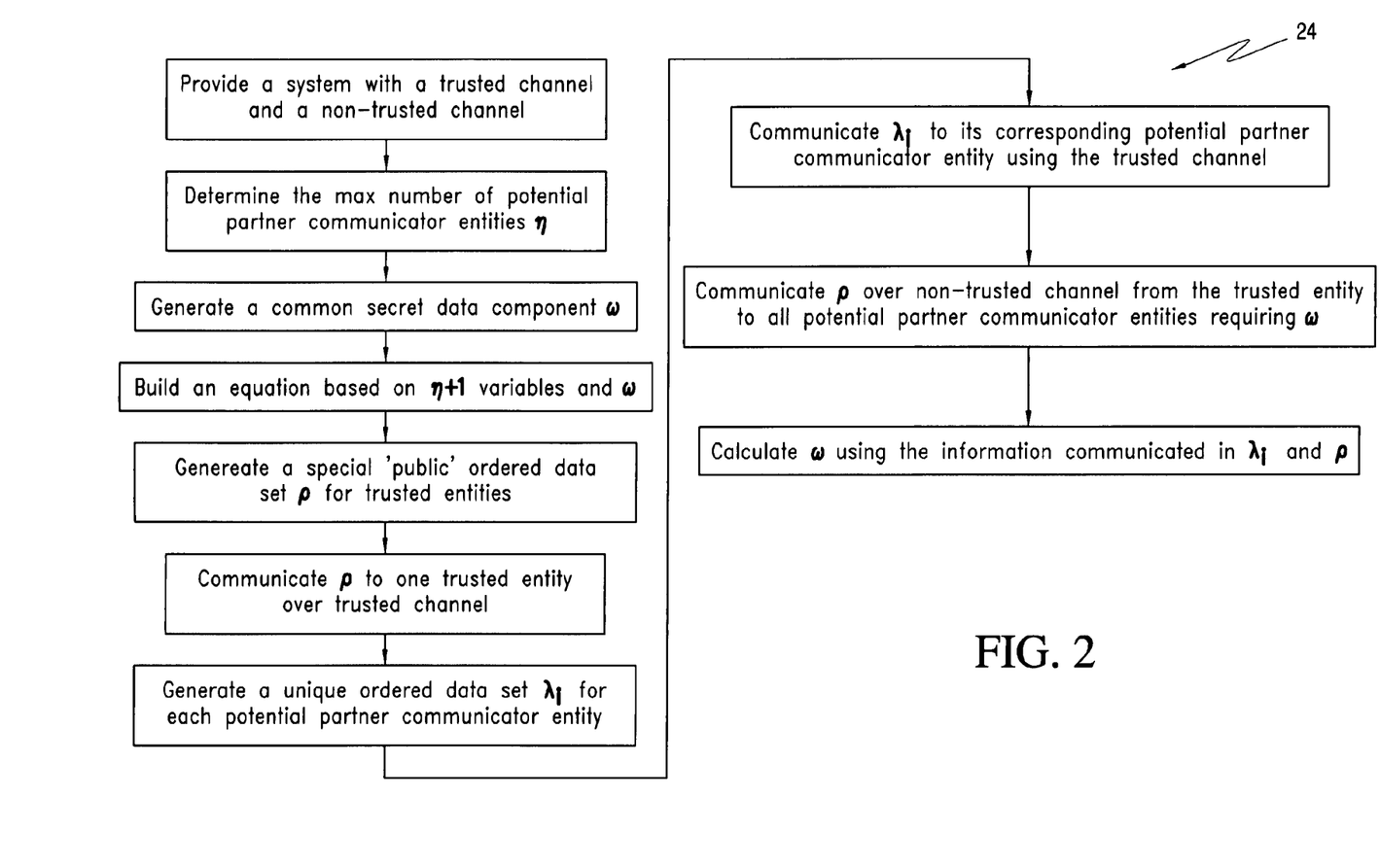
FIG. 2 is a block diagram of a method for secure distribution of pre-generated key material using a high order and/or convolved knowledge sharing.

Now referring to FIG. 2, a block diagram of a method for secure distribution of pre-generated key material/common secret data in the cryptographic system 10 using a high order and/or convolved knowledge sharing/key split scheme is illustrated, designated generally as 24. The system generates or obtains a common secret data component (e.g. Symmetric Key), denoted as $\omega$, and places it into an escrow system (alternatively $\omega$ may be retrieved from an escrow system). Skill within the art of cryptography allows for the design of an escrow system and processing of the elements to be described below without actually generating a 'payload encryption key' (PEK) prior to its use by partner communicator entities. Typically, this requires operating the process several times and combining the output of the process according to the escrow system. The process described simplifies this step of the process and assumes to start with a PEK (or other secret data). In cases where the secret data being distributed does not represent cryptographic key material (e.g. use of this technique to transmit messages to a notary), or does not require escrow, this step is trivialized.

The system builds an equation based upon the maximum number of the potential partner communicator entities $\eta$ in the system, wherein the common secret data component, $\omega$, is part of the equation and the equation is based upon $\eta+1$ variables. The system generates a special ordered data set, denoted as $\rho$, for one trusted entity from the equation for later distribution to the multiple partner communicator entities.

Then the system communicates the special ordered data set $\rho$ over the trusted communications channel to the trusted entity. The system then generates a unique data set, denoted as $\lambda_i$, for each of the potential partner communicator entities in the system from the equation, where i=0, 1, . . . $\eta$−1, and communicates $\lambda_i$ to the corresponding potential partner communicator entity using the trusted communications channel. When the need arises for the communicator entity to reconstruct $\omega$, the trusted entity communicates the special ordered data set $\rho$ over the non-trusted communications channel from the trusted entity to each of the potential partner communicator entities requiring the common secret data component $\omega$. Finally, using a combination of the special ordered data set $\rho$ and the unique ordered data set $\lambda_i$, each of the potential partner communicator entities requiring the common secret data component $\omega$ can calculate the common secret data $\omega$ from the information communicated by $\lambda_i$ and $\rho$.

In the ideal case, asymmetric keys would be used over the non-trusted channel by providing a trusted communications channel atop/nested within. While this is not a necessity for confidentiality in cases where the secret data is not a pre-generated or escrowed key, this does prevent an unauthorized party from spoofing the trusted entity. Even if the trusted entity is successfully spoofed, the malicious party is at most able to cause the use of different although still unknown data. A malicious party cannot generate proper $\lambda_i$ and $\rho$ data sets which satisfy the equation, so this will cause deviations from the equation where each communicator entity ends up with different 'common' secret data (therefore it is no longer common). The communicator entities will no longer have a common representation of the secret data, where the data represents cryptographic key material; this would represent a potential denial of service attack.

The minimum requirement for the trusted channel used atop the non-trusted channel (hereafter referred to as a nested trusted channel) is to provide proof of origin to protect against the denial of service attack described above. By providing proof of origin non-repudiation, the communicator may recognize and simply discard data which was not generated/provided by an authorized source. If a greater awareness of the system is desired or necessary for system assurance purposes, proof of receipt may also be provided by the nested trusted channel. While it may be mathematically proven that confidentiality protection of the 'public' ordered data set $\rho$ communicated by the trusted entity does not reveal either the common secret data or the 'private' ordered data set of any communicator entity, encryption of this data is considered a best practice and is included in the steps below. In addition, if the 'public' ordered data set is truly made public to any malicious party, it could be used to validate attempts by such a party to compromise the system by providing an initial point from which to perform a known-ciphertext attack.

Figure 3:
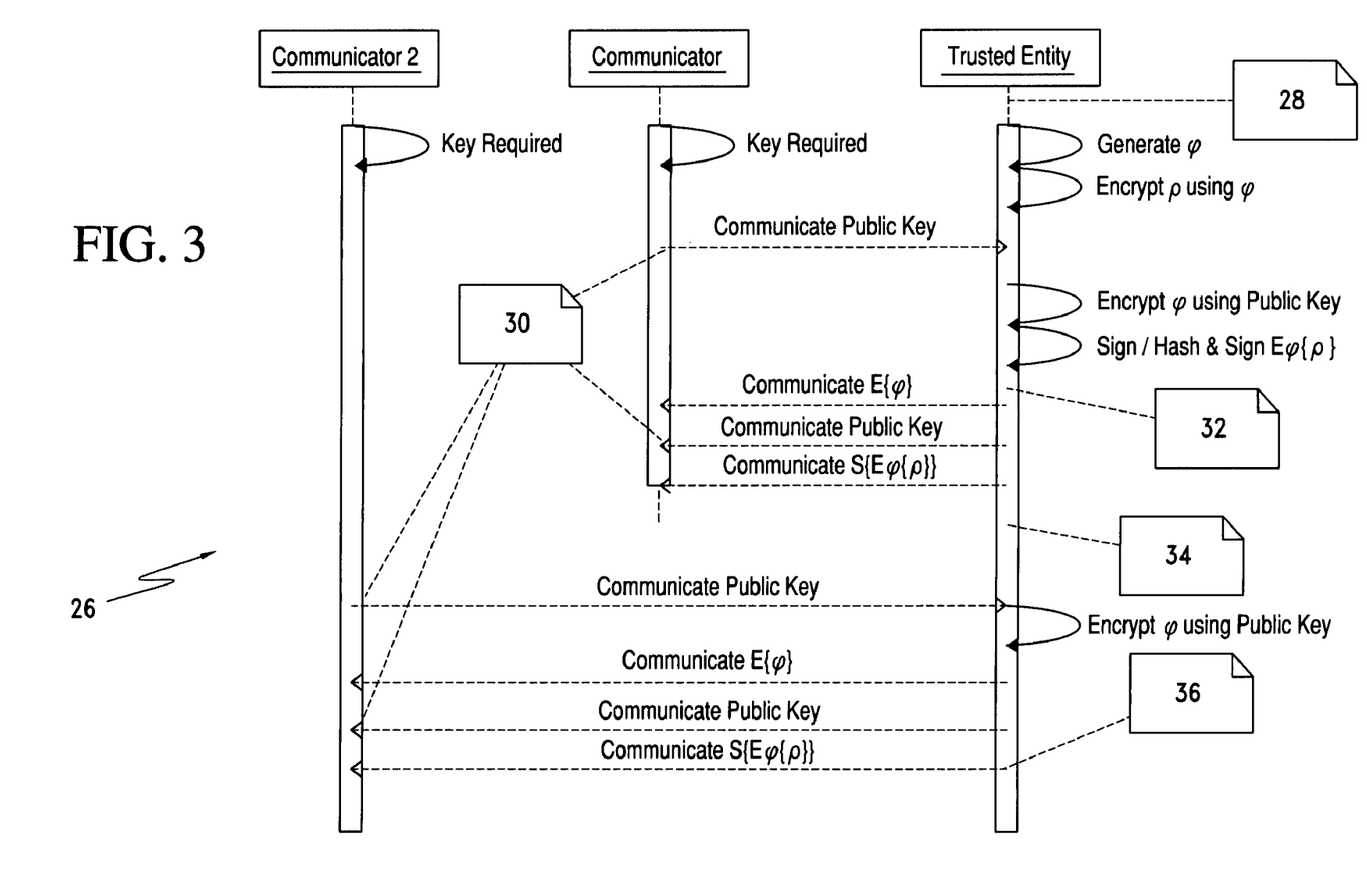
FIG. 3 is a sequence diagram showing the steps of distributing common secret data.

Referring to FIG. 3, the steps of providing the nested trusted communications channel which provides proof of origin atop the non-trusted channel as described above and using the channel can be summarized by the following steps:
  a) encryption of the ordered data set (denoted as E{$\rho$}) by the trusted entity utilizing the public key of each partner communicator entity;
  b) signing/hashing and signing the encrypted ordered data set E{$\rho$} by the trusted entity (denoted as S{E{$\rho$}}) utilizing its own private key;
  c) accounting for an attempted distribution of the encrypted ordered data set by the trusted entity;
  d) communicating the signed and encrypted ordered data set S{E{$\rho$}} to the multiple partner communicator entities by the trusted entity;
  e) each partner communicator entity decrypts the encrypted ordered data set utilizing the corresponding private key (see FIG. 4);
  f) each partner communicator entity uses the public key to verify the message originated at the trusted entity, completing the process to 38; and,
  g) optionally each partner entity retains the signed message from the trusted entity, completing the process to 40;
  wherein, the trusted communications channel protects distribution of the common secret data to prevent repudiation by the trusted entity and to account for the common secret data which was received.

In addition, it is also necessary or desirable in many cases to provide proof of receipt non-repudiation allowing the trusted entity to later prove reception of $\rho$ and calculation of $\omega$. The steps of providing the nested trusted channel with proof of origin requires the following additional steps:
  a) Each communicator entity uses its corresponding private key to sign and communicate a message to the trusted entity indicating successful calculation of $\omega$, where the signed message is denoted as S{m}; and,
  b) The trusted entity accounts for the verified distribution of the encrypted version of $\rho$ by retaining the signed and encrypted message S{m} received from each communicator which successfully received $\rho$ and/or completed the calculations required to obtain $\omega$.
  wherein, the trusted communications channel: protects distribution of the common secret data to prevent repudiation by the trusted entity at the communicator entity, prevents repudiation by the communicator entities at the trusted entity, and accounts for the common secret data which was received.

Clearly, this approach does not scale well for the trusted entity if $\rho$ is large and there are a large number $\eta$ of potential partner communicator entities. Referring back to FIG. 3, in addition to achieving bandwidth efficient communication, the method of providing a nested trusted communication channel may be modified to achieve greater efficiency. The solution to these issues is solved through the same mechanism. Remembering the primary purpose of this nested trusted channel is to provide non-repudiation capabilities to both the trusted entity and the communicator entity, confidentiality may be performed in a more efficient manner, whereby the confidentiality of $\rho$ is still protected from malicious parties.

Reducing the computational efforts required for large $\rho$ data blocks, instead of encrypting the public ordered data set ($\rho$) directly using the public key of each individual partner communicator entity, it could be encrypted using a simple symmetric key which is created from a random number, denoted as $\phi$. The trusted entity then performs the encryption of $\rho$ using the random number $\phi$ and a symmetric cipher, resulting in $E_\phi\{\rho\}$. This random number would still need to be provided to each partner communicator entity. By encrypting the much smaller number $\phi$ using the public key of each partner communicator entity, resulting in an $E_i\{\phi\}$ for each partner communicator entity, the encryption effort which must be performed by the trusted entity is significantly reduced. As noted by process block 30, the public keys of the trusted entity may be provided to the communicator entities during distribution of data from the trusted entity, or during system setup when $\lambda_i$ is provided. Likewise, the public keys of the communicator entities may be provided to the trusted entity at either time. If the communicators are capable of receiving the $E_\phi\{\rho\}$ encrypted data set using a broadcast mechanism, this approach also serves to reduce the amount of communications bandwidth required. This optimization becomes particularly important if the communications channels utilize wireless technology. As shown by process block 36, the trusted entity will be required to retransmit $S\{E_\phi\{\rho\}\}$ if broadcast is not supported; however, encryption of $\rho$ only needs to be performed once.

A potential attack on the system in the form of denial of service may be caused by failure of the trusted entity to provide data, or (most probable in the case of military applications) elimination of the trusted entity. To mitigate this threat, the data set $\rho$ entrusted by the trusted entity may simply be cloned and provided to an additional, redundant trusted entity.

The following is an example illustrating of the generation of the $\lambda_i$ and $\rho$ data sets from secret data $\omega$ (hereafter referred to as a key), where $\omega$ can be most easily generated from a payload encryption key, digital certificate or other message comprised of a small number of bits.

In an embodiment starting from Shamir's Threshold Scheme (Adi Shamir, "How to Share a Secret", *Communications of the ACM*, 22(1), pp 612-613, 1979), the equation based on $\eta+1$ variables is a polynomial equation (a standard application of Shamir's Threshold Scheme would use only $\eta$ variables). Assuming a single distribution element may be used, or redundant distribution elements are merely clones, the result is a polynomial order $\eta$. For $\eta=5$, this results in $f(x)=a_5x^5+a_4x^4+a_3x^3+a_2x^2+a_1x^1+a_0x^0$. Each of the $a_x$ values excluding any one value is selected as a random number. In a simple case this results in $f(x)=5x^5+4x^4+3x^3+2x^2+1x^1+\omega 1$, where $a_0$ is replaced by a key represented as $\omega$. $\omega$ may represent any $a_x$ value, so long as all parties agree to the value being represented. Each of partner entities (hereafter referred to as nodes) in the system is provided with a single point on the $f(x)$ curve. It must be noted for this example that the point $(0, f(0))$ must be avoided as $f(0)$ would yield $\omega$ in this scenario. Using 7 as a simple key the resulting distribution would be:

$$\eta_1 \to f(1)=(5x^5+4x^4+3x^3+2x^2+1x^1+7*1)=22 \to (1,22)$$

$$\eta_2 \to f(2)=(5*2^5+4*2^4+3*2^3+2*2^2+1*2^1+7*1)=265 \to (2,265)$$

$$\eta_3 \to f(3)=(5*3^5+4*3^4+3*3^3+2*3^2+1*3^1+7*1)=1648 \to (3,1648)$$

$$\eta_4 \to f(4)=(5*4^5+4*4^4+3*4^3+2*4^2+1*4^1+7*1)=6379 \to (4,6379)$$

$$\eta_5 \to f(5)=(5*5^5+4*5^4+3*5^3+2*5^2+1*5^1+7*1)=18562 \to (5,18562)$$

Given $f(x)=a_5x^5+a_4x^4+a_3x^3+a_2x^2+a_1x^1+a_0x^0$ a node would then need to solve for $a_0$ in order to determine the key is 7. In order to solve $f(x)$ for 6 unknowns, 6 points are required. Since $\eta=5$, even if all nodes were to combine information it would not be possible to build a key. A node would either be required to have knowledge of two points on the curve, or another trusted node would be required to distribute the final unknown point to all of the nodes of the network. If the point (6, 44797) were provided, enough data would be known to perform Gaussian Elimination indicating that $\omega=7$.

Accordingly, since the combination of the data held by all nodes does not reveal enough information to build a key, and further a node is not allowed to reveal its data point the relationship is inverted. By providing 5 unique points on the curve, one to each communicator entity, the communicator entities are able to calculate that $\omega=7$ without knowledge of the data held by the other nodes (once the points have been combined with at least 5 data points from the trusted entity). In this case, the trusted entity would provide $(6,f(6))$, $(7,f(7))$, $(8,f(8))$, $(9,f(9))$, $(10,f(10))$ as a simple example. An illustration of this process is shown in FIG. 3, designated generally as 26.

If the system were not required to perform escrow and/or protect against weak data in the case of key material, or if the generated shares were distributed appropriately, it would be trivial to generate the components from the trusted entity randomly. The curve used to generate the shares would be unknown to all parties, including the system component which provides data to the trusted entity.

In the (classical) solution where Shamir's Threshold Scheme is used, each node is required to maintain a set of knowledge shares for each secret data item. This scheme also would require participation amongst a minimum number of communicators from the set $\eta$ to provide data to one another. If one node were to become compromised, or were to give out false knowledge shares, the entire system could become compromised. In addition to the inefficiencies and lack of flexibility, previous innovations do not include provisions for distribution of additional data using the same private knowledge shares, nor do prior inventions allow for secure operation once a subset of participants have been compromised. Many of potential systems to use the technology would be constructed as embedded systems which do not contain all of the storage required to maintain this data indefinitely, where this innovation requires a much smaller set of data to be stored by the end communicator. Finally, this classical solution does not allow for the provision of sending multiple sets of secret data (or multiple keys) without replacing the shares, unless using a discrete 'share' at the trusted entity which represents the missing component of each individual node.

To address distribution of an additional secret data $\omega_2$ using this innovation, the process begins with use of the points $\lambda_i$ which were previously provided to all potential communicators. Using the previous example, a new curve $g(x)=a_5x^5+a_4x^4+a_3x^3+a_2x^2+a_1x^1+\omega_2x^0$ is constructed where all of the points $\lambda_i$ are placed on the curve. Since there is still at least one unknown, all coefficient $a_x$ values may be regenerated randomly. The new curve $g(x)$ may now be used to generate a new $\rho$ value corresponding to $\omega_2$. As in this example, the new curve would then be used to generate $(6,g(6))$, $(7,g(7))$, $(8,g(8))$, $(9,g(9))$, $(10,g(10))$ which could then be distributed to the partner communicator entities by the trusted entity. $\rho$ is also provided to any redundant trusted entities, and in turn to the communicators.

Now, if there were a desire to eliminate a node from the system due to compromise, change of agreement or other scenario it is not necessary to change data on any of the other nodes. In building a new key, the new curve would be generated without including the $\lambda_i$ point which is known to the undesired node. The order of the equation could be changed, allowing $\rho$ to contain less data in the case of a polynomial. The curve could also simply be derived from additional random data. In scenarios where $\omega$ is available allowing the system to be aware of the full equation $g(x)$ the final element was not simply generated randomly. This case is more secure because a test may be performed to ensure the point $\lambda_i$ previously provided to the now undesired node is not on the curve.

A unique opportunity is also available, most useful in situations of compromise where a reverse attack is desirable. In order to take advantage of the attacker, the attacker would have to believe he/she had not been discovered. The attacker would be provided the unique points on the key split curve from the distribution element (this action also helps to ensure the attacker believes he/she has not been discovered). Since the attacker will solve the curve using a point which is not on the actual curve, the attacker will believe he/she has found the new secret data. This data is in fact different from the one in use by the rest of the system, and may be used to provide false information, launch a reverse attack or for another similar purpose. Unfortunately, it is also possible for a trusted entity in collusion with one or more communicator entities to instigate such an attack.

If the event that collusion by the trusted entity (as described above) is of significant concern, this innovation also may be adapted to protect against this threat. This is accomplished by providing a mechanism which will require communications with an additional trusted entity, containing a unique 'public' ordered data set. In this case, the equation used to generate ordered data sets must be comprised of at least one additional variable for each additional (non-redundant) trusted entity.

Modification of this innovation such that communication with two or more trusted entities is necessary, based upon the above description should be intuitive to those who are skilled in the art of cryptography and secret sharing.

Figure 4:
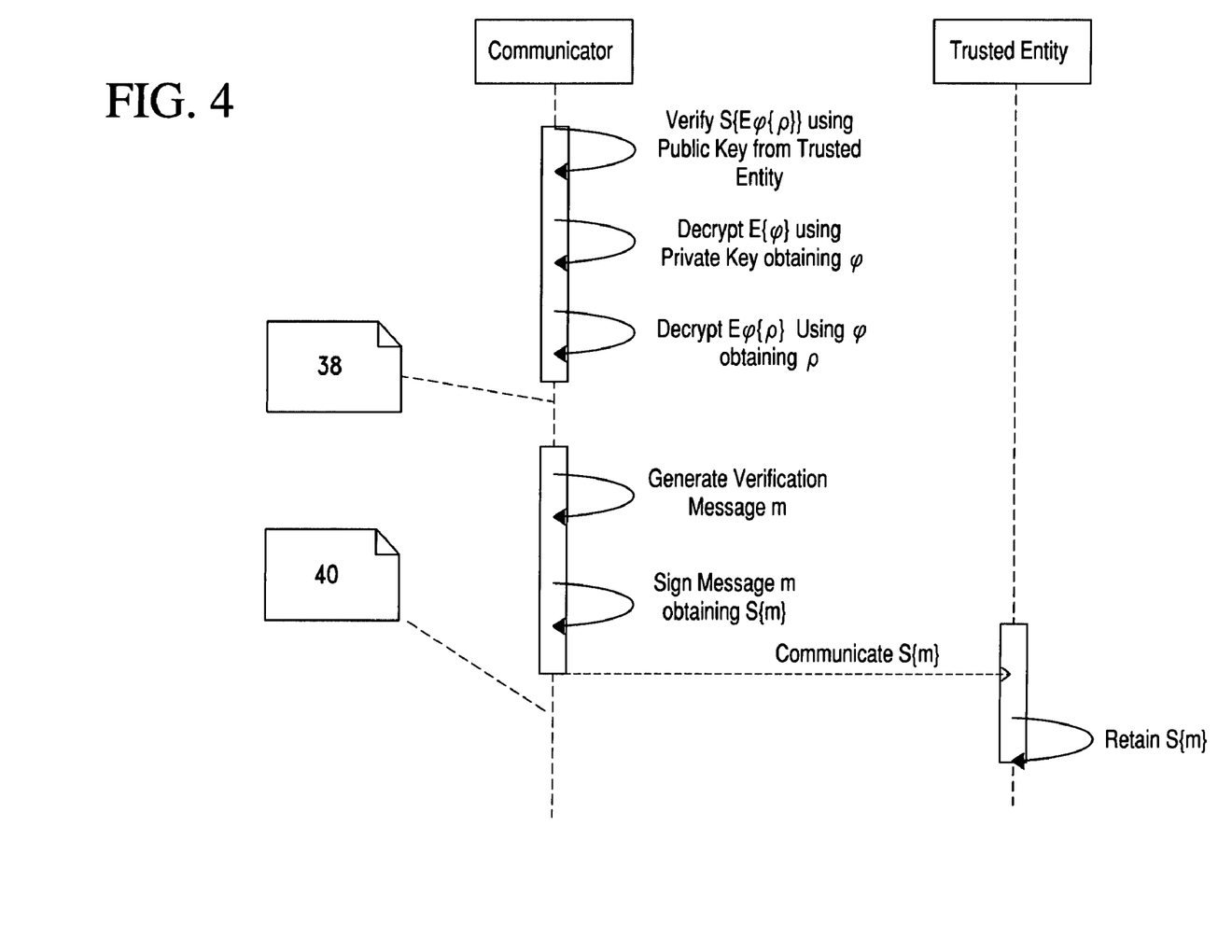
FIG. 4 is a sequence diagram showing the steps of receiving common secret data and providing a response to trusted entity/entities.

Considering the example above, if $\eta=4$ partner communicator entities were present rather than 5, the exact set of equations presented would allow for the establishment of an additional trusted entity. Before taking this as fact, one must look at how the knowledge sharing scheme mathematically functions with respect to information theory. Prior to communicating with the trusted entity, the partner communicator entities (considering in total) would require a single additional element to establish a key. This element is provided by the trusted entity. To require an additional trusted entity, would mean the communicators also require an additional element. Defining $\ominus$ as the number of trusted entities from which a communicator entity must acquire data, the equation must consist of $\eta+\ominus+1$ variables. Referring to FIG. 3 and FIG. 4, each trusted entity performs the steps indicated between process blocks 28 and 32.

In addition, each additional trusted entity would need to contain its own unique $\rho$ value (hereinafter referred to as $\rho_\ominus$), where each communicator entity performs the steps between process blocks 34 and 36 for each trusted entity from which data must be acquired. While the $\rho_\ominus$ value to be used by the additional trusted entity could be build from completely unique data derived from the generator equation, this is very inefficient in most cases. The goal is to decrease the computation required in the system to produce $\rho_\ominus$, which also reduces the size of the data which must be communicated in the polynomial case. All but one sub-component of $\rho_\ominus$ is shared. $\rho_\ominus$ must also be unique from $\rho$ by at least the factor of $\lambda_i$, which is simply a single ordered pair in the example above. Expressed mathematically, an ordered data set $\rho_\ominus$ has $\xi_j$ knowledge sub-components. $\xi_j$ where $j=\eta+1, 1, \ldots, 2\eta$ are shared amongst all trusted entities. Each ordered data set $\rho_\ominus$ is also composed of a unique $\xi_j$ for $j=2\eta+1, 2\eta+2, \ldots, 2\eta+\ominus+1$. These equations may be reduced to $\xi_j$ where $j=0, 1, \ldots, \eta-1$ for common $\xi_j$ and $j=\eta, \eta+1 \ldots \eta+\ominus$; however, the prior representation of the equations allows for generation of an individual $\xi_j$ using $(j,f(j))$.

Returning to the example ($\ominus=2$, $\eta=4$), this would mean constructing $\rho_1=\{(5,f(5)), (6,f(6)), (7,f(7)), (8,f(8)), (9,f(9))\}$ to the first trusted entity. Then generating the ordered pair $(10,f(10))$ for the additional trusted entity and providing the additional trusted entity constructing $\rho_2=\{(5,f(5)), (6,f(6)), (7,f(7)), (8,f(8)), (10,f(10))\}$, where the set of $\xi_j$ for $j=5, 6, 7, 8$ is $\{(5,f(5)), (6,f(6)), (7,f(7)), (8,f(8))\}$ as common to the all trusted entities allows for this additional level of protection. In the case of a polynomial, $\xi_j$ is constructed in the same manner as $\lambda_i$; however, the data sets must not overlap. For this reason the equations for generating $\xi_j$ have been represented in both reduced form and in a form more appropriate to generating $\xi_j$.

Note, in this simplistic example, an additional data point is not required for the additional trusted entity because the number of potential partner communicators was reduced. Generally speaking, as additional trusted entities are added $\eta$ would be held constant, while the order of the equation would be increased by one for each additional trusted entity.

This same approach may be applied when generating a new key, in which case $(5,g(5)), (6,g(6)), (7,g(7)), (8,g(8))$ would be provided in common amongst the trusted entities, and $(9,g(9))$ would be unique to the first trusted entity where $(10,g(10))$ would be unique to the second trusted entity.

Likewise, if there are availability concerns with respect to the trusted entities, both $\rho_1$ and $\rho_2$ could be cloned and provided to additional trusted entities, so long as no entity was provided with both $\rho_1$ and $\rho_2$.

Other embodiments and configurations may be devised without departing from the spirit of the invention and the scope of the appended claims.

The invention claimed is:

1. A computer implemented method for communicating common secret data within a computer system having a set of entities, said set of entities comprising at least one trusted entity and a plurality of partner communicator entities, said plurality of potential partner communicator entities being provided with a public certificate and a private key, wherein a subset of said plurality of partner communicator entities attempt to join together to compromise said computer system, said computer implemented method of communicating, comprising the steps of:
   a) providing a computer system having a non-trusted communications channel, and a trusted communications channel;
   b) determining a maximum number of potential partner communicator entities in said computer system, said maximum number of said potential partner communicator entities being denoted as $\eta$;
   c) generating a common secret data component, denoted as $\omega$;
   d) building an equation based upon said maximum number of said potential partner communicator entities $\eta$ in said system, wherein said common secret data component, $\omega$, is part of said equation, and said equation is based upon $\eta+1$ variables;
   e) generating a special 'public' ordered data set, denoted as $\rho$, for one trusted entity from said equation for later distribution to said plurality of potential partner communicator entities;
   f) communicating said special 'public' ordered data set $\rho$ over said trusted communications channel to said trusted entity;
   g) generating a unique ordered data set, denoted as $\lambda_i$ for each of said potential partner communicator entities in said system from said equation, where $i=0, 1, \ldots \eta-1$;
   h) communicating said $\lambda_i$ unique ordered data sets to said corresponding potential partner communicator entity using said trusted communications channel;
   i) communicating said special ordered data set $\rho$ using said non-trusted communications channel from said trusted entity to each of said plurality of potential partner communicator entities requiring said common secret data component $\omega$; and, j) using a combination of said special ordered data set ρ and said unique ordered data set $\lambda_i$ to calculate said common secret data ω from the information communicated by $\lambda_i$ and ρ.

2. The method of claim 1 wherein said trusted communications channel comprises a floppy disk.

3. The method of claim 1 wherein said trusted communications channel comprises a flash card.

4. The method of claim 1 wherein said trusted communications channel comprises a CD/DVD-ROM.

5. The method of claim 1 wherein said trusted communications channel comprises a portable hard drive.

6. The method of claim 1, wherein said step of generating a common secret data component, comprises the step of generating a payload encryption key as said common secret data component.

7. The method of claim 1, wherein said step of building an equation based upon said maximum number of potential partner communicator entities η in said computer system, comprises the step of building a polynomial equation.

8. The method of claim 1, wherein said step of communicating said special ordered data set ρ, comprises the step of communicating said special 'public' ordered data set ρ to multiple trusted entities for redundancy.

9. The method of claim 1 wherein said non-trusted communications channel comprises a nested trusted communications channel.

10. The method of claim 1, wherein said step of using a non-trusted communications channel by providing and using a nested trusted communications channel, comprises the steps of:
   a) encrypting said 'public' ordered data set ρ utilizing said public keys of said public certificate of said plurality of potential partner communicator entities by said trusted entity, said encrypted ordered data set ρ being denoted as E{ρ};
   b) signing/hashing and signing said encrypted ordered data set E{ρ} by said trusted entity, said signed and encrypted ordered data set being denoted as S{E{ρ}};
   c) accounting for an attempted distribution of said encrypted ordered data set E{ρ} by said trusted entity;
   d) communicating said signed and encrypted ordered data set S{E{ρ}} to said plurality of potential partner communicator entities by said trusted entity;
   e) using said public key of said trusted entity by said plurality of potential partner communicator entities to verify authenticity of said signed and encrypted ordered data set S{E{ρ}}; and,
   f) decrypting said encrypted ordered data set E{ρ} utilizing said corresponding private keys by said plurality of potential partner communicator entities;
   wherein, said nested trusted communications channel protects distribution of said common secret data with non-repudiation by providing proof of origin of said common secret data at said trusted entity to said plurality of potential partner communicator entities.

11. The method of claim 10, wherein at least one of said plurality of potential partner communicator entities accounts for reception of said encrypted ordered data set E{ρ} from said trusted entity by said plurality of potential partner communicator entities by retaining said signed and encrypted ordered data set S{E{ρ}}.

12. The method of claim 10, further comprising the steps of:
   a) using said corresponding private key to sign a message to said trusted entity indicating successful calculation of said common secret data by each of said plurality of potential partner communicator entities, said signed message being denoted as S{m}; and,
   b) accounting for verified distribution of said encrypted ordered data set E{ρ} by way of retaining said signed messages S{m} received from said plurality of potential partner communicator entities by said trusted entity;
   wherein, said steps provide non-repudiation in the form of proof of receipt of said common secret data by said potential partner communicator entities to said trusted entity.

13. The method of claim 9, wherein said step of using a nested trusted communications channel, comprises the steps of:
   a) generating a random number, denoted as φ, by said trusted entity;
   b) encrypting said random number φ utilizing said public keys of said plurality of potential partner communicator entities by said trusted entity, said encrypted random number being denoted as $E_i\{\phi\}$;
   c) encrypting said special 'public' ordered data set ρ utilizing a symmetric cipher, and φ as a key for said cipher by said trusted entity, said encrypted 'public' ordered data set being denoted as $E_\phi\{\rho\}$;
   d) singing said encrypted ordered data set $E_\phi\{\rho\}$ by said trusted entity, said signed and encrypted ordered data set being denoted as $S\{E_\phi\{\rho\}\}$;
   e) accounting for an attempted distribution of said encrypted ordered data set $E_\phi\{\rho\}$ by said trusted entity;
   f) communicating said encrypted random number $E_i\{\phi\}$ to corresponding said plurality of potential partner communicator entities by said trusted entity;
   g) communicating said signed and encrypted 'public' ordered data set $S\{E_\phi\{\rho\}\}$ using said non-trusted communications channel in 'broadcast' by said trusted entity;
   h) decrypting said encrypted random number $E_i\{\phi\}$ using said corresponding private keys by said plurality of potential partner communicator entities;
   i) using said public key of said trusted entity by said plurality of potential partner communicator entities to verify authenticity of said signed and encrypted ordered data set $S\{E_\phi\{\rho\}\}$; and,
   j) decrypting said encrypted special public ordered data set $E_\phi\{\rho\}$ utilizing φ by said plurality of potential partner communicator entities;
   wherein, said steps provide optimization for bandwidth efficiency and said nested trusted communications channel protects distribution of said common secret data with non-repudiation by providing proof of origin of said common secret data at said trusted entity to said plurality of potential partner communicator entities.

14. The method of claim 13, wherein at least one of said plurality of potential partner communicator entities accounts for reception of said encrypted ordered data set E{ρ} from said trusted entity by said plurality of potential partner communicator entities by retaining said signed and encrypted ordered data set S{E{ρ}}.

15. The method of claim 13, further comprising the steps of:
   a) using said corresponding private key to sign a message to said trusted entity indicating successful calculation of said common secret data by each of said plurality of potential partner communicator entities, said signed message being denoted as S{m}; and,
   b) accounting for verified distribution of said encrypted ordered data set E{ρ} by way of retaining said signed messages S{m} received from said plurality of potential partner communicator entities by said trusted entity;

wherein, said steps provide non-repudiation in the form of proof of receipt of said common secret data by said plurality of potential partner communicator entities to said trusted entity.

16. A computer implemented method for communicating common secret data within a computer system having a set of entities, said set of entities comprising a plurality of trusted entities and a plurality of partner communicator entities, said plurality of potential partner communicator entities being provided with a public certificate and a private key, wherein a subset of said plurality of partner communicator entities and all but one of said trusted entities attempt to join together to compromise said computer system, said computer implemented method of communicating, comprising the steps of:

a) providing a computer system having a non-trusted communications channel and a trusted communications channel;

b) determining a maximum number of potential partner communicator entities in said computer system, said maximum number of potential partner communicator entities being denoted as η;

c) determining the number of fixed plurality of trusted entities, denoted as $\ominus$;

d) generating a common secret data component, denoted as ω;

e) building an equation based upon said maximum number of potential partner communicator entities η in said system and said number of trusted entities $\ominus$ in said system, wherein said common secret data component, ω, is part of said equation, and said equation is based upon η+$\ominus$+1 variables;

f) generating a special ordered data set, denoted as $\rho_\theta$, for each said trusted entity from said equation;

g) communicating each said ordered data set $\rho_\theta$ over said trusted communications channel to each said trusted entity;

h) generating a unique ordered data set, denoted as $\lambda_i$, for each of said potential partner communicator entities in said system from said equation, where i=0, 1, ... η−1;

i) communicating said $\lambda_i$ unique ordered data sets to said plurality of potential partner communicator entities using said trusted communications channel;

j) communicating all said special ordered data sets $\rho_\theta$ over said non-trusted communications channel from said trusted entities to each of said plurality of potential partner communicator entities requiring said common secret data component ω; and, k) using a combination of all said special ordered data sets $\rho_\theta$ and said ordered data set $\lambda_i$ to calculate said common secret data ω from the information communicated by $\lambda_i$ and said special ordered data sets $\rho_\theta$.

17. The method of claim 16 wherein said trusted communications channel comprises a floppy disk.

18. The method of claim 16 wherein said trusted communications channel comprises a flash card.

19. The method of claim 16 wherein said trusted communications channel comprises a CD/DVD-ROM.

20. The method of claim 16 wherein said trusted communications channel comprises a portable hard drive.

21. The method of claim 16, wherein said step of generating a common secret data component, comprises the step of generating a payload encryption key as said common secret data component.

22. The method of claim 16, wherein said step of building an equation based upon said maximum number of potential partner communicator entities η in said computer system, comprises the step of building a polynomial equation.

23. The method of claim 16, wherein said step of communicating each said special 'public' ordered data set $\rho_\theta$ to said trusted entities, comprises the step of communicating each $\rho_\theta$ to said plurality of trusted entities for redundancy.

24. The method of claim 16, wherein said non-trusted communications channel comprises a nested trusted communications channel.

25. The method of claim 16, wherein said step of using a non-trusted communications channel by providing and using a nested trusted communications channel, comprises the steps of:

a) encrypting each said 'public' ordered data set $\rho_\theta$ utilizing said public keys of said public certificate of said plurality of potential partner communicator entities by each of said plurality of trusted entities, said encrypted ordered data set $\rho_\theta$ being denoted as E{$\rho_\theta$};

b) signing said encrypted ordered data set E{$\rho_\theta$} by each said trusted entity, said signed and encrypted ordered data set being denoted as S{E{$\rho_\theta$}};

c) accounting for an attempted distribution of said encrypted ordered data set E{$\rho_\theta$} by each said trusted entity;

d) communicating said signed and encrypted ordered data set S{E{$\rho_\theta$}} to said plurality of potential partner communicator entities by each said trusted entity;

e) using said public key of each said trusted entity by said plurality of potential partner communicator entities to verify authenticity of each said signed and encrypted ordered data set S{E{$\rho_\theta$}}; and, f) decrypting each said encrypted ordered data set E{$\rho_\theta$} utilizing said corresponding private keys by said plurality of potential partner communicator entities;

wherein, said nested trusted communications channel protects distribution of said common secret data with non-repudiation by providing proof of origin of said common secret data at each said trusted entity to said plurality of potential partner communicator entities.

26. The method of claim 25, wherein at least one of said plurality of potential partner communicator entities accounts for reception of at least one said encrypted ordered data set E{ρ} from each said trusted entity by said plurality of potential partner communicator entities by retaining said signed and encrypted ordered data set S{E{$\rho_\theta$}}.

27. The method of claim 25, further comprising the steps of:

a) using said corresponding private key to sign a message to each said trusted entity indicating successful calculation of said common secret data by each of said plurality of potential partner communicator entities, said signed message being denoted as S{m}; and, b) accounting for verified distribution of said encrypted ordered data set E{$\rho_\theta$} by way of retaining said signed messages S{m} received from said plurality of potential partner communicator entities by said trusted entity;

wherein, said steps provide non-repudiation in the form of proof of receipt of the common secret data by said plurality of potential partner communicator entities to each said trusted entity.

28. The method of claim 27, wherein said step of using the private key of each said partner communicator entity to sign a message to each said trusted entity is optimized by signing a single message which is sent to said plurality of trusted entities.

29. The method of claim 24, wherein said step of using a nested trusted communications channel, comprises the steps of:
  a) generating a random number, denoted as $\phi_\ominus$, by said trusted entity;
  b) encrypting said random number $\phi_\ominus$ utilizing said public keys of said plurality of potential partner communicator entities by each said trusted entity, said encrypted random number being denoted as $E_i\{\phi_\ominus\}$;
  c) encrypting each said special 'public' ordered data set $\rho_\ominus$ utilizing a symmetric cipher, and $\phi_\ominus$ as a key for said cipher by each said trusted entity, said encrypted special 'public' ordered data set being denoted as $E_\phi\{\rho_\ominus\}$;
  d) singing each said encrypted ordered data set $E_\phi\{\rho_\ominus\}$ by each said trusted entity, said signed and encrypted ordered data set being denoted as $S\{E_\phi\{\rho_\ominus\}\}$;
  e) accounting for an attempted distribution of said encrypted ordered data set $E_\phi\{\rho_\ominus\}$ by each said trusted entity;
  f) communicating each said encrypted random number $E_i\{\phi_\ominus\}$ to corresponding said plurality of potential partner communicator entities by each said trusted entity;
  g) communicating each said signed and encrypted 'public' ordered data set $S\{E_\phi\{\rho_\ominus\}\}$ using said non-trusted communications channel in 'broadcast' by each said trusted entity;
  h) decrypting each said encrypted random number $E_i\{\phi_\ominus\}$ using said corresponding private keys by said plurality of potential partner communicator entities;
  i) using said public key of each said trusted entity by said plurality of potential partner communicator entities to verify authenticity of each said signed and encrypted ordered data set $S\{E_\phi\{\rho_\ominus\}\}$; and,
  j) decrypting each said encrypted special public ordered data set $E_\phi\{\rho_\ominus\}$ utilizing $\phi_\ominus$ by said plurality of potential partner communicator entities;
  wherein, said steps provide optimization for bandwidth efficiency and said nested trusted communications channel protects distribution of said common secret data with non-repudiation by providing proof of origin of said common secret data at each said trusted entity to said potential partner communicator entities.

30. The method of claim 29, wherein at least one of said plurality of potential partner communicator entities accounts for reception of said encrypted ordered data set $E\{\rho_\ominus\}$ from at least one of said trusted entities by said plurality of potential partner communicator entities by retaining said signed and encrypted ordered data set $S\{E\{\rho_\ominus\}\}$.

31. The method of claim 29, further comprising the steps of:
  a) using said corresponding private key to sign a message to each said trusted entity indicating successful calculation of said common secret data by each of said plurality of potential partner communicator entities, said signed message being denoted as $S\{m\}$; and,
  b) accounting for verified distribution of said encrypted ordered data set $E\{\rho_\ominus\}$ by way of retaining said signed messages $S\{m\}$ received from said plurality of potential partner communicator entities by each said trusted entity;
  wherein, said steps provide non-repudiation in the form of proof of receipt of said common secret data by each of said plurality of potential partner communicator entities to each said trusted entity.

32. The method of claim 22, where said $\ominus$ trusted entities are each provided a unique said public ordered data set denoted as $\rho_\theta$, and all $\rho_\theta$ are composed of common $\xi_j$ where $j=0, 1, \ldots, \eta-1$ and, each said ordered data set $\rho_\theta$ is also composed of a unique $\xi_j$ for $j=\eta, \eta+1, \ldots, \eta+\ominus$.

33. The method of claim 16, wherein said step of communicating each said special ordered data set $\rho_\theta$, comprises the step of communicating each said special ordered data set $\rho_\theta$ to said plurality of trusted entities for redundancy.

34. The method of claim 31, wherein said step of communicating each $\rho_\theta$ to each of said plurality of potential partner communicator entities requiring said common secret data component $\omega$ is optimized by communicating said common $\xi_j$ components from a single trusted entity.

35. The method of claim 31, wherein said step of using said private key of each of said plurality of potential partner communicator entity to sign a message to each said trusted entity is optimized by signing a single message which is sent to all trusted entities.

* * * * *